United States Patent
Klier et al.

(10) Patent No.: US 9,387,851 B2
(45) Date of Patent: Jul. 12, 2016

(54) ADAPTIVE ELECTRONIC STABILITY CONTROL

(71) Applicant: Robert Bosch GmbH, Stuttgart (DE)

(72) Inventors: Willy Klier, West Bloomfield, MI (US); Ravi Bhadange, Farmington, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/471,491

(22) Filed: Aug. 28, 2014

(65) Prior Publication Data

US 2016/0059851 A1 Mar. 3, 2016

(51) Int. Cl.
*B60W 30/02* (2012.01)
*B60W 30/14* (2006.01)
*B60W 40/068* (2012.01)

(52) U.S. Cl.
CPC ............. *B60W 30/02* (2013.01); *B60W 30/146* (2013.01); *B60W 40/068* (2013.01); *B60W 2420/42* (2013.01); *B60W 2550/12* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,101,870 A * | 7/1978 | Ekman | ................... | B60K 28/06 180/170 |
| 5,436,835 A * | 7/1995 | Emry | ................... | B60T 7/22 340/435 |
| 5,663,880 A * | 9/1997 | Saur et al. | ................... | 701/93 |
| 5,679,092 A * | 10/1997 | Otsubo | ................... | B60K 28/165 180/197 |
| 5,699,056 A * | 12/1997 | Yoshida | ................... | G01C 21/26 340/905 |
| 5,854,987 A * | 12/1998 | Sekine et al. | ................... | 701/41 |
| 5,892,855 A * | 4/1999 | Kakinami et al. | ................... | 382/291 |
| 5,911,771 A * | 6/1999 | Reichart | ................... | F16H 59/60 477/97 |
| 6,169,940 B1 * | 1/2001 | Jitsukata | ................... | B62D 1/28 340/903 |
| 6,254,259 B1 * | 7/2001 | Kobayashi | ................... | B60Q 1/085 340/459 |
| 6,691,015 B1 * | 2/2004 | Levine | ................... | B60K 31/00 180/171 |
| 6,873,898 B1 * | 3/2005 | Kostadina | ................... | B60K 28/16 340/539.28 |
| 6,895,310 B1 * | 5/2005 | Kolls | ................... | G01M 17/007 341/123 |
| 7,840,341 B1 | 11/2010 | Sato et al. | | |
| 8,352,120 B2 | 1/2013 | Craig et al. | | |
| 8,589,049 B2 | 11/2013 | Craig | | |
| 2009/0093927 A1 | 4/2009 | Mueller-Schneiders et al. | | |
| 2010/0185389 A1 | 7/2010 | Woodard | | |
| 2013/0085639 A1 | 4/2013 | Sethi et al. | | |
| 2014/0188350 A1 | 7/2014 | Popham et al. | | |
| 2015/0224925 A1 | 8/2015 | Hartmann | | |

FOREIGN PATENT DOCUMENTS

| | | |
|---|---|---|
| DE | 102011121487 | 6/2013 |
| EP | 2048476 | 4/2009 |
| EP | 2154043 | 2/2010 |
| WO | 2013/007800 | 1/2013 |
| WO | 2014/094766 | 6/2014 |

OTHER PUBLICATIONS

International Search Report and Written Opinion for Application No. PCT/US2015/040930 dated Nov. 25, 2015 (13 pages).

* cited by examiner

*Primary Examiner* — Thomas Tarcza
*Assistant Examiner* — Edward J Pipala
(74) *Attorney, Agent, or Firm* — Michael Best & Friedrich LLP

(57) ABSTRACT

An adaptive control adjusts thresholds in a vehicle stability control in response to video camera data, GPS data and weather data indicating that vehicle road conditions are not ideal. Video data determines mue (coefficient of friction) and type of road. Weather data includes temperature, visibility, precipitation and wind velocity. A human machine interface manually overrides the adaptive control in response to a user input.

20 Claims, 3 Drawing Sheets

ADAPTIVE ELECTRONIC STABILITY CONTROL

BACKGROUND

The present invention relates to an arrangement for adjusting electronic stability control in response to video data from a camera mounted on a host vehicle and global positioning weather signals.

SUMMARY

In one embodiment, the invention provides a method for providing vehicle stability control in weather conditions, that includes: receiving weather data via a global positioning signal; receiving video data from a video camera mounted to a vehicle; determining whether to provide a restricted driving condition in response to the weather data and the video data; and restricting operation of the vehicle in response to the determination of a restricted driving condition.

In some embodiments, restricting operation of the vehicle comprises modifying standard thresholds of a vehicle stability control by providing restricted thresholds and/or limiting maximum vehicle speed of an engine control.

One embodiment includes receiving an input from a human machine interface to enable or disable the restricting of operation of the vehicle.

In another embodiment, receiving weather data comprises receiving at least two selected from the group of temperature, visibility, precipitation and wind velocity.

In one embodiment, determining a driving condition includes processing the video data to determine a type of road from the group of a tar road, a dirt road, a sand road, a cement road and a gravel road; and/or processing the video data to determine a coefficient of friction for the road and tires.

In one embodiment, determining a driving condition includes processing the video data to determine a coefficient of friction for the road and tires.

In another embodiment, the invention provides a vehicle control system for restricting operation of a vehicle depending on weather and road conditions, comprising: a global positioning system receiver for receiving weather data via a global positioning signal; a video camera mounted to a vehicle for providing video data; a data processor for receiving the weather data and the video data to determine a driving condition; a driving condition recognition unit for determining whether to output a restrictive driving control signal in response to the driving condition; and a communication network for providing communication for the global positioning system receiver, the video camera, the data processor and the driving condition recognition unit.

In one embodiment, the driving condition recognition unit provides a restricted driving control signal to a speed limiter of an engine control for restricting maximum vehicle speed.

In one embodiment, the driving condition recognition unit provides a restricted driving control signal to the vehicle stability control for modifying thresholds of the vehicle stability control.

In one embodiment, determining a driving condition includes processing the video data to determine a road condition including one of standing or running water, an icy road surface, a smooth road surface and a rough road surface.

In another embodiment, the invention provides a method for vehicle stability control in weather conditions, the method comprising: receiving weather data via a global positioning signal; receiving video data from a video camera mounted to a vehicle; determining driving conditions from the weather data and the video data; determining whether to provide a restricted driving condition in response to the driving conditions; and restricting operation of the vehicle in response to the determination of a restricted driving condition by modifying standard thresholds of a vehicle stability control by providing restricted thresholds.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
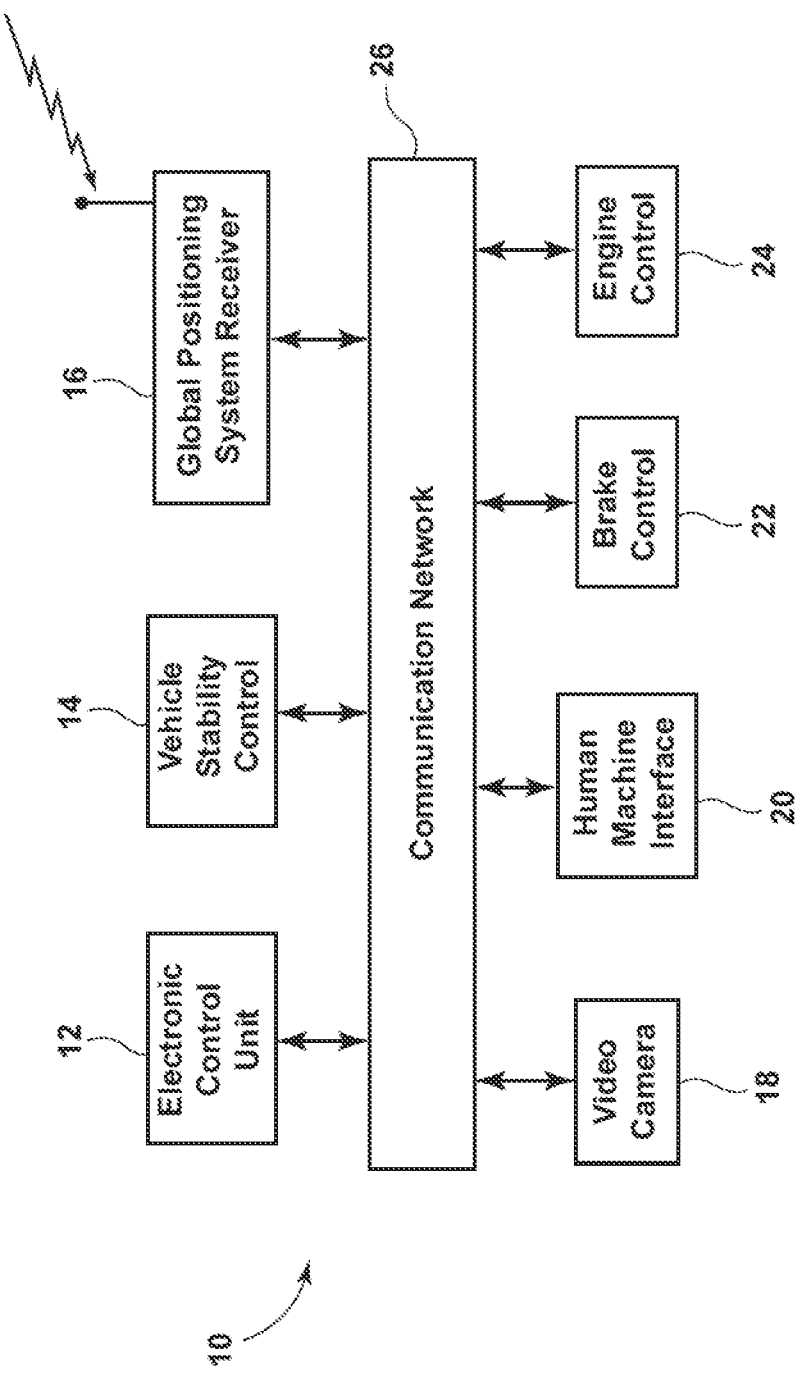
FIG. 1 is a block diagram of a vehicle operating system according to one embodiment.

FIG. 1 illustrates a relevant portion of a vehicle operating system 10 that controls vehicle stability in response to GPS data and video camera data. The system 10 includes an electronic control unit 12 and a vehicle stability control 14. Further, the vehicle operating system 10 includes a global positioning system (GPS) receiver 16 and a video camera 18. A human/machine interface 20 receives manual inputs from a vehicle operator. The operating system 10 includes a brake control 22 and an engine control 24 that, in some situations are controlled by the vehicle stability control 14. A communication network 26, such as a CAN bus or a Flex-Ray bus, provides communication between all of the devices, controls and units of the vehicle operating system 10 shown in FIG. 1. Various other subsystems (not shown) connect to the communication network 26.

Figure 2:
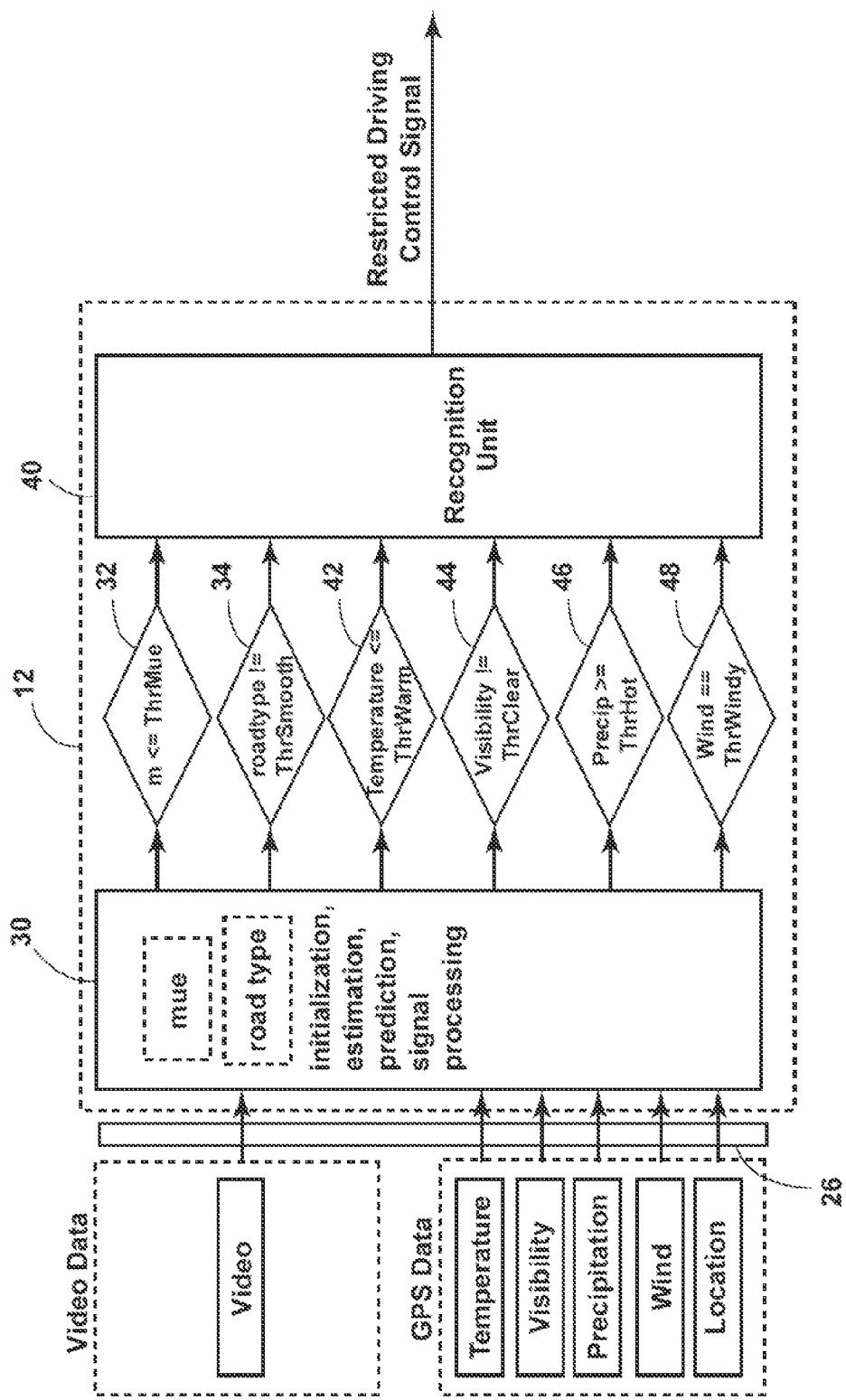
FIG. 2 is a block diagram showing video data and GPS data provided to a data processor of an electronic control unit.

FIG. 2 shows video camera data and GPS data provided via the communication network 26 to the electronic control unit 12. The electronic control unit 12 provides adaptive control of vehicle operation. The electronic control unit 12 includes a data processor 30 that receives the video camera data and determines mue and road-type of a roadway therefrom. Mue relates to a coefficient of friction between vehicle tires and a road surface. Values for mue and the road-type are output by the processor 30 and compared with values at steps or comparisons 32, 34. The values for mue and the road-type are provided to a driving condition recognition unit 40 of the electronic control unit 12.

The data processor 30 also receives temperature, visibility, precipitation, wind velocity and vehicle location/position data from the GPS receiver 16. The data processor 30 compares temperature, visibility, precipitation and wind velocity with values at steps 42, 44, 46, 48. At step 50, location/position of the vehicle is used, in some embodiments, to look up road conditions or other information specific to the present vehicle location and future vehicle path from a data table. Outputs from the steps or comparisons 42, 44, 46, 48, 50 are provided to the recognition unit 40.

The driving condition recognition unit 40 includes a plausibility check and arbitration algorithm to determine whether the various weather and road conditions result in a need for restrictive thresholds or other changes to the operation of the vehicle stability control 14 and/or the engine control 24. The recognition unit determines whether the data is plausible and the results are possible. Further, the arbitration algorithm weighs the various data to determine whether there is a need for restrictive thresholds. The driving condition recognition unit 40 also determines whether a maximum speed of the vehicle must be limited by the operation of the engine control 24, and if so, a value for the maximum vehicle speed.

Operation

In operation, the video camera data is provided from the video camera 18 over communication network 26 to a data processor 30 of the electronic control unit 12. The data processor 30 includes initializing, estimating and predictive features for the data provided thereto. The data processor 30 determines a mue and a road-type from the video data. The mue is compared with a stored value. The comparisons for the mue and the road-type are provided to the driving condition recognition unit 40 for further processing. More specifically, the mue is obtained by the camera viewing the road. Conditions, including one of standing or running water, an icy road surface, a smooth road surface and a rough road surface, including uneven road surfaces, such as potholes formed in a road, are estimated. The road conditions are factored in determining a mue value.

The video camera 18 and data processor 30 also detect road type, such as a tar road, a dirt road, a cement road, a sand road and a gravel road, as well as roughness of the road surface. The above conditions, including road-type are related to mue, which is a coefficient of friction for the road and vehicle tires.

In one embodiment, essentially simultaneously with processing video camera data, the data processor 30 of the electronic control unit 12 obtains temperature, visibility, precipitation, wind velocity and location information from the GPS receiver 16 over the communication network 26 as shown in FIG. 2. The data processor 30 utilizes initialization, estimation and prediction to determine when the vehicle must be placed in a restricted driving mode or condition.

More specifically, the temperature, visibility, precipitation and wind velocity are compared with various values to determine their significance with respect to restrictive driving. For example, if a temperature of below freezing is present, along with precipitation, the driving condition recognition unit 40 of the electronic control unit 12 will output a restricted driving control signal 58 over the communication network 26. In such an instance, the restricted driving control signal 58 passes from the recognition unit 40 over the network 26 to the vehicle stability control 14 as shown in FIG. 3.

Figure 3:
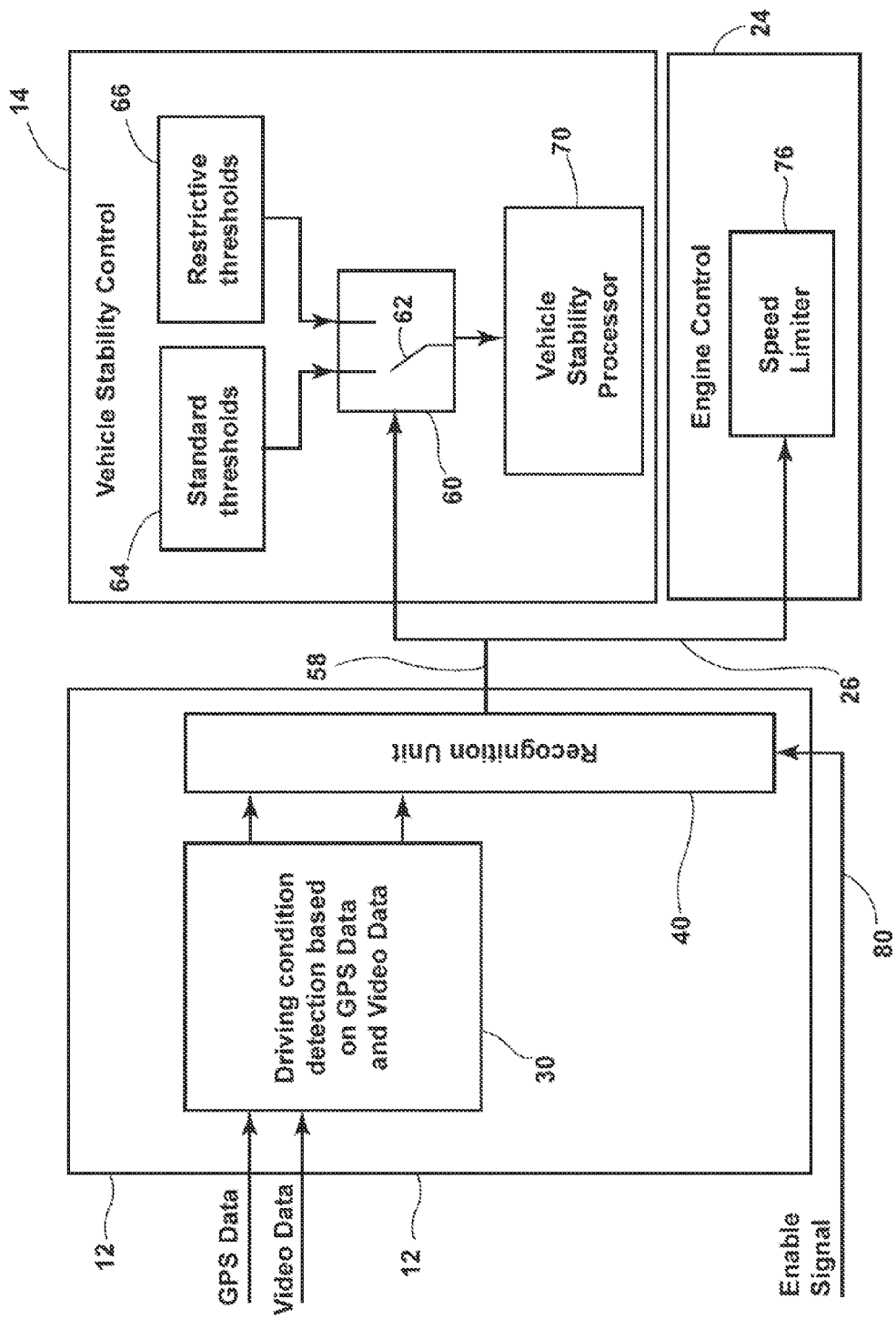
FIG. 3 is a block diagram showing an electronic control unit that includes an overall recognition unit for selectively providing a restricted driving mode signal to a vehicle stability control.

As shown in FIG. 3, the vehicle stability control 14 receives the restricted driving control signal 58 from the electronic control unit 12 over the network 26. FIG. 3 shows a switch unit 60 having a switch 62. The restricted driving control signal 58 causes the switch 62 to change from selection of standard thresholds 64 to restrictive thresholds 66. The thresholds 64, 66 have values that are provided to a vehicle stability processor 70. The vehicle stability processor 70 of the vehicle stability control 14 provides signals to the brake control 22, the engine control 24 and other controls or devices to ensure proper operation of the vehicle operating system 10 under various conditions.

In response to different values of the video data and the GPS weather data, the electronic control unit 12 shown in FIG. 3 provides an engine speed control signal 72 over the network 26 to a speed limiter 76 of the engine control 24. The speed limiter 76 prevents the vehicle from exceeding a maximum speed as a result of the weather condition data and/or the video data.

While a switch unit 60 is illustrated for the vehicle stability control 14 in FIG. 3, in some embodiments, the control signal 58 is a message to the vehicle stability processor 70 that provides a selection between standard thresholds 64 represented by values stored in non-volatile memory and restrictive thresholds 66 that are stored in the non-volatile memory that is connected to the processor 70. In some embodiments, one of multiple sets of restrictive thresholds is selected by the restricted driving control signal 58 based on values of the video data and the GPS weather data.

In one embodiment, an operator overrides and stops operation of driving condition recognition by the electronic control unit 12. As shown in FIG. 3, an input to the human/machine interface 20 by an operator results in an enable signal 80 that is provided the driving condition recognition unit 40 for enabling or disabling the restricted driving control signals output by the recognition unit. Thus, a vehicle operator may disconnect entirely the portion of the vehicle operating system 10 with regard to the GPS weather signals being combined with video data to automatically change the thresholds of the vehicle stability control 14 in view of the different weather and vehicle conditions.

In some embodiments, an outdoor temperature value is obtained by a temperature sensor mounted to a vehicle. In other embodiments, weather information is relayed to the vehicle by RF antennas disposed along a roadway, rather than by a GPS signal.

While the electronic control unit 12 is shown having the data processor 30 and the driving condition recognition unit 40 disposed therein, in some embodiments the functions of the electronic control unit 12 receiving and processing all of the data are performed by the vehicle stability processor 70. Other electronic controls of the vehicle operating system 10 also may function as the electronic control unit 12.

While data processor 30 and driving condition recognition unit 40 are shown and disclosed, other arrangements such as ASIC circuits and digital circuits are contemplated for signal processing.

Thus, the invention provides, among other things, a method and system for enhancing vehicle stability in response to video camera data and a GPS signal that includes weather data. Various features and advantages of the invention are set forth in the following claims.

What is claimed is:

1. A method for providing vehicle stability control in weather conditions, the method comprising:
   receiving location/position data via a global positioning signal;
   receiving weather information;
   receiving video data from a video camera mounted to a vehicle;
   determining whether to provide a restricted driving condition in response to the location/position data, the weather information and the video data; and
   restricting operation of the vehicle in response to the determination of a restricted driving condition.

2. The method according to claim 1, wherein the step of restricting operation of the vehicle comprises modifying standard thresholds of a vehicle stability control by providing restricted thresholds.

3. The method according to claim 2, wherein the step of restricting operation of the vehicle further comprises operating an engine control to limit maximum vehicle speed.

4. The method according to claim 1, including the step of receiving an input from a human machine interface to enable or disable the restricting of operation of the vehicle, and wherein receiving weather information includes receiving the weather information from an RF antenna.

5. The method according to claim 1, wherein the step of receiving weather information comprises receiving at least two selected from the group of temperature, visibility, precipitation and wind velocity, and the step of determining whether to provide a restricted driving condition includes looking up road conditions or other information specific to a present vehicle location and a future vehicle path from a data table.

6. The method according to claim 1, wherein the step of determining a driving condition includes processing the video data to determine a type of road from the group of a tar road, a dirt road, a sand road, a cement road and a gravel road.

7. The method according to claim 6, wherein the step of determining a driving condition includes processing the video data to determine a coefficient of friction for the road and tires.

8. The method according to claim 1, wherein the step of determining a driving condition includes processing the video data to determine a coefficient of friction for the road and tires.

9. A method for providing vehicle stability control in weather conditions for a vehicle, the method comprising:
   obtaining video data with a video camera mounted to the vehicle;
   receiving location/position data at an electronic control unit via a global positioning signal;
   receiving weather data at the electronic control unit;
   receiving at the electronic control unit the video data from the video camera mounted to the vehicle;
   determining driving conditions from the receiving location/position data, the weather data and the video data;
   determining whether to provide a restricted driving condition in response to the driving conditions; and
   restricting operation of the vehicle in response to the determination of a restricted driving condition by modifying standard thresholds of a vehicle stability control by providing restricted thresholds.

10. The method according to claim 9, wherein the step of restricting operation of the vehicle further comprises operating an engine control to limit maximum vehicle speed.

11. The method according to claim 9, including the step of receiving an input from a human machine interface to enable or disable the restricting of operation of the vehicle.

12. The method according to claim 9, wherein the step of receiving weather data comprises receiving at least two selected from the group of temperature, visibility, precipitation and wind velocity and the step of determining driving conditions includes processing the video data to determine a type of road from the group of a tar road, a dirt road, a sand road, a cement road and a gravel road.

13. The method according to claim 9, wherein the step of determining driving conditions includes processing the video data to determine a coefficient of friction for the road and tires.

14. The method according to claim 9, wherein the step of determining driving conditions includes processing the video data to determine a road condition including one of standing or running water, an icy road surface, a smooth road surface and a rough road surface and wherein receiving the weather information includes receiving the weather information from an RF antenna.

15. A method for providing vehicle stability control in weather conditions, the method comprising:
   receiving location/position data;
   receiving weather data including at least two selected from the group of temperature, visibility, precipitation and wind velocity;
   receiving video data from a video camera mounted to a vehicle;
   determining driving conditions from the receiving location/position data, the weather data and processing the video data to determine a type of road from a group consisting of a tar road, a dirt road, a sand road, a cement road and a gravel road;
   determining whether to provide a restricted driving condition in response to the driving conditions; and
   restricting operation of the vehicle in response to the determination of a restricted driving condition by modifying standard thresholds of a vehicle stability control by providing restricted thresholds.

16. The method according to claim 15, wherein the step of restricting operation of the vehicle further comprises operating an engine control to limit maximum vehicle speed.

17. The method according to claim 15, including the step of receiving an input from a human machine interface to enable or disable the restricting of operation of the vehicle.

18. The method according to claim 15, wherein the step of determining driving conditions includes processing the video data to determine a coefficient of friction for the road and tires, the step of restricting operation of the vehicle further comprises limiting maximum vehicle speed of an engine control.

19. The method according to claim 18, including the step of receiving an input from a human machine interface to enable or disable the restricting of operation of the vehicle.

20. The method according to claim 19, wherein receiving the weather information includes receiving the weather information from an RF antenna.

* * * * *